(12) United States Patent
El-Wardany et al.

(10) Patent No.: US 9,737,965 B2
(45) Date of Patent: Aug. 22, 2017

(54) ROLL PEENING TOOLING AND PROCESS

(75) Inventors: Tahany Ibrahim El-Wardany, Bloomfield, CT (US); Daniel V. Viens, Mansfield Center, CT (US); Robert A. Grelotti, Colchester, CT (US); John F. Zimmerman, South Glastonbury, CT (US); Joseph J. Sangiovanni, West Suffield, CT (US); Lee A. Hoffman, Vernon, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1611 days.

(21) Appl. No.: 13/355,831

(22) Filed: Jan. 23, 2012

(65) Prior Publication Data

US 2013/0186161 A1   Jul. 25, 2013

(51) Int. Cl.
*B23P 9/02*  (2006.01)
*B24B 39/00*  (2006.01)
(Continued)

(52) U.S. Cl.
CPC .............. *B23P 9/02* (2013.01); *B24B 39/006* (2013.01); *B24B 39/06* (2013.01); *C21D 7/08* (2013.01);
(Continued)

(58) Field of Classification Search
CPC ... B23P 9/02; B23P 9/04; B24B 39/06; B24B 39/006; C21D 7/08; F01D 5/286;
(Continued)

(56) References Cited

U.S. PATENT DOCUMENTS 1,812,479 A * 6/1931 Hahnemann ........... B21D 17/04
                                                          72/101
2,471,490 A * 5/1949 Mercer ......................... 72/178
(Continued)

FOREIGN PATENT DOCUMENTS

DE          4309176 A1      9/1994
EP          1813686 A1      8/2007
(Continued)

OTHER PUBLICATIONS

European Search Report for European Patent Application No. 13150692.5 completed Apr. 22, 2013.

*Primary Examiner* — Edward Moran
*Assistant Examiner* — Pradeep C Battula
(74) *Attorney, Agent, or Firm* — Carlson, Gaskey & Olds, P.C.

(57) ABSTRACT

An example peening tool includes at least one first roller having a peening surface disposed about and along a first core. At least a portion of the at least one first roller is configured to contact a component to be peened along a length. The length extends along at least a portion of the first core. The at least one first roller is configured to provide line contact on the component along the length. A profile of the at least one first roller is determined based on a profile of the component. The peening tool includes a backer disposed in register with the first plurality of rollers such that the first plurality of rollers moves with the backer during peening. The at least one first roller and the backer are configured to be arranged on opposing surfaces of the component. Peening models may predict peening parameters and controller settings.

13 Claims, 6 Drawing Sheets

(51) Int. Cl.
*B24B 39/06* (2006.01)
*C21D 7/08* (2006.01)
*F01D 5/28* (2006.01)

(52) U.S. Cl.
CPC .......... *F01D 5/286* (2013.01); *F05D 2260/94* (2013.01)

(58) Field of Classification Search
CPC ..... B21D 27/02–2027/022; B21D 5/08; B21D 5/14; B21D 5/10; B21D 5/146; F05D 2260/94
USPC ............ 29/90.7, 90.3; 72/53, 101, 107, 166
See application file for complete search history.

(56) References Cited

U.S. PATENT DOCUMENTS

| | | | |
|---|---|---|---|
| 3,290,915 A | | 12/1966 | Cornell |
| 3,827,270 A | * | 8/1974 | Neilsen ................ B21D 19/005 29/90.7 |
| 4,103,406 A | * | 8/1978 | Ito ............................ B21D 5/08 492/1 |
| 4,471,521 A | | 9/1984 | Goeke et al. |
| 5,666,841 A | * | 9/1997 | Seeger ...................... B23P 9/02 72/110 |
| 5,771,729 A | * | 6/1998 | Bailey et al. ..................... 72/53 |
| 5,863,239 A | | 1/1999 | Barton, II |
| 6,846,680 B2 | * | 1/2005 | Friswell ................ B01L 3/0279 73/864.14 |
| 6,926,970 B2 | | 8/2005 | James et al. |
| 7,013,544 B2 | * | 3/2006 | Yasuda et al. ................. 29/27 C |
| 7,219,044 B1 | | 5/2007 | Prevey et al. |
| 7,513,121 B2 | | 4/2009 | Zurecki et al. |
| 7,600,404 B2 | * | 10/2009 | Prevey, III ........................ 72/75 |
| 7,805,972 B2 | | 10/2010 | Prevey, III |

FOREIGN PATENT DOCUMENTS

| | | |
|---|---|---|
| EP | 1941968 A2 | 7/2008 |
| JP | 2000317828 | 11/2000 |
| WO | 2007055864 A2 | 5/2007 |

* cited by examiner

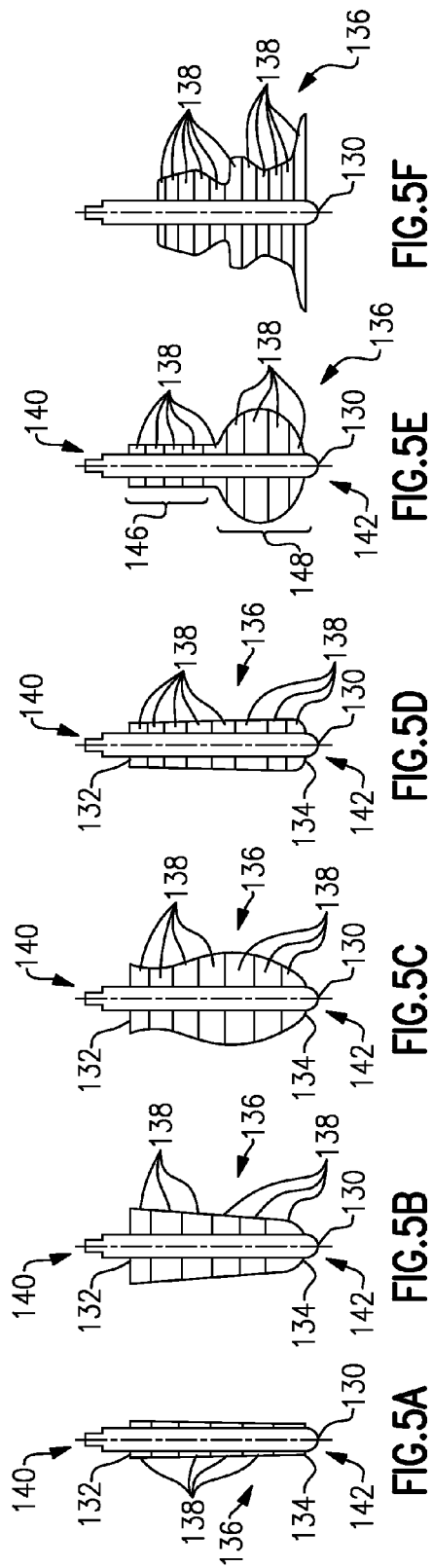

ROLL PEENING TOOLING AND PROCESS

TECHNICAL FIELD

This disclosure generally relates to peening tooling, and more specifically to peening tooling for roll peening.

BACKGROUND

Turbomachinery, such as fan blades, compressor components, and integrally bladed rotors (IBRs) experience high vibration and intense tensile stresses during operation. These stresses make such components susceptible to high cycle fatigue, and stress corrosion cracking, all of which may reduce service life of the component. Turbomachinery may also be susceptible to foreign object damage, which can speed the initiation and propagation of fatigue cracks, affecting service life.

When an IBR blade is damaged, the entire IBR must be removed from the engine to be repaired or replaced. Where individual blades may be attached to a disk through the blade's root, the individual blade may be separately removed and repaired.

When an IBR blade is created and joined to the IBR, processes must account for the entire IBR. Where individual blades may be attached to a disk through the blade's root, the individual blade may be individually created.

When either initial manufacture or repair is undertaken, peening processes are known to enhance the surface properties of turbomachinery to increase fatigue strength and fatigue life by inducing residual stresses in the surfaces of the turbomachinery.

SUMMARY

These and other features of the present disclosure can be best understood from the following specification and drawings, the following of which is a brief description.

An example peening tool includes at least one first roller having a peening surface disposed about and along a first core. At least a portion of the at least one first roller is configured to contact a component to be peened along a length. The length extends along at least a portion of the first core. The at least one first roller is configured to provide line contact on the component along the length. A profile of the at least one first roller is determined based on a profile of the component. The peening tool also includes a backer or backers disposed in register with the first plurality of rollers such that the first plurality of rollers moves with the backer/backers during peening. The at least one first roller and the backer or backers are configured to be arranged on opposing surfaces of the component.

An example tooling system for peening includes a milling machine having a spindle moveable along three (3) axes and a base moveable about two (2) axes and configured to hold at least one component. The tooling system also includes a peening tool attached to the spindle, the peening tool including at least one first roller having a peening surface disposed about and along a first core. At least a portion of the at least one first roller is configured to contact a component to be peened along a length. The length extends along at least a portion of the first core. The at least one first roller is configured to provide line contact on the component along the length. A profile of the at least one first roller is determined based on a profile of the component. The peening tool also includes at least one second roller is disposed about and along a second core. The at least one second roller is in register with the at least one first roller such that the at least one first roller moves with the at least one second roller during peening. The at least one first roller and the at least one second roller are configured to be arranged on opposing surfaces of the component.

An example method for peening a component includes providing a component having a profile at least partially configured to be peened. A peening tool is arranged for use on a milling machine. The peening tool includes at least one first roller having a peening surface disposed about and along a first core. At least a portion of the at least one first roller is configured to contact a component to be peened along a first length. The first length extends along at least a portion of the first core. The at least one first roller is configured to provide line contact on the component along the length. A profile of the at least one first roller is determined based on the profile of the component. The peening tool also includes a backer in register with the at least one first roller such that the at least one first roller move with the backer. The at least one first roller and the backer are arranged on opposing surfaces of the component and contact opposing surfaces of the component. The at least one first roller and the backer move along the opposing surfaces of the component such that the at least one first roller peens at least a portion of one of the opposing surfaces.

BRIEF DESCRIPTION OF THE DRAWINGS

FIG. 5a is cross-sectional view of an example profile of a roller of the example peening tool of FIG. 2.

FIG. 5b is cross-sectional view of another example profile of a roller of the example peening tool of FIG. 2.

FIG. 5c is cross-sectional view of another example profile of a roller of the example peening tool of FIG. 2.

FIG. 5d is cross-sectional view of another example profile of a roller of the example peening tool of FIG. 2.

FIG. 5e is cross-sectional view of another example profile of a roller of the example peening tool of FIG. 2.

FIG. 5f is cross-sectional view of another example profile of a roller of the example peening tool of FIG. 2.

DETAILED DESCRIPTION

Figure 1:
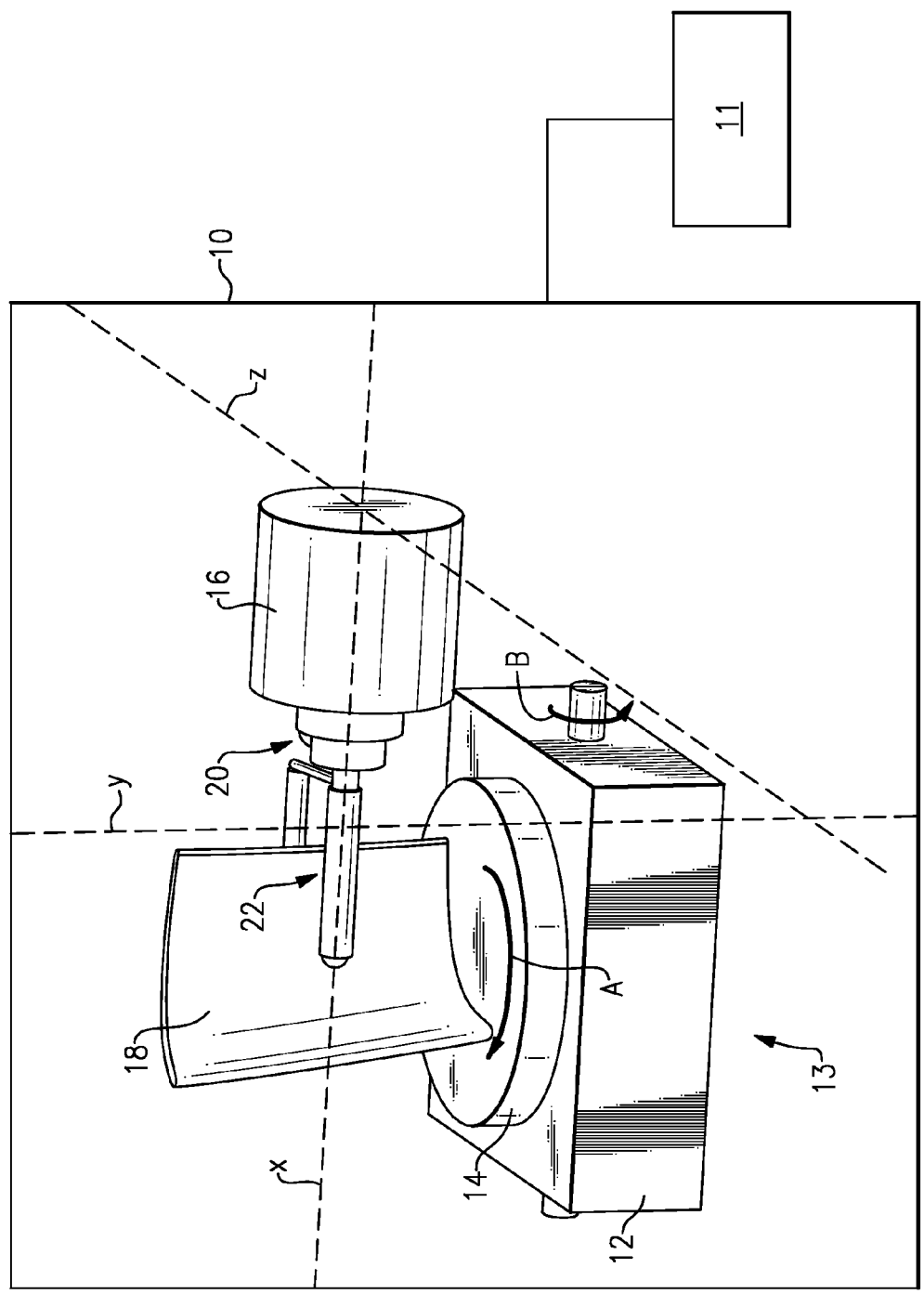
FIG. 1 is a perspective view of portions of an example milling machine.

Referring to FIG. 1, an example milling machine 10, such as a CNC milling machine, is shown. The milling machine 10 includes a base 13, having a platform 12 and a table 14, a spindle 16, and a tool holder 20 to hold peening tool 22. A component 18 such as an airfoil or blade for a turbomachine (not shown) or other component 18 that undergoes peening, is disposed on table 14. However, other types of components 18 may be used.

The controller 11, shown schematically, is in communication with the milling machine 10 to determine and control peening parameters on given areas of the component 18, depth of peening depending on the component geometry 18, and other similar parameters considered during the peening process. The controller 11 controls the rotation speed of the peening tool 22. The controller 11 also controls the peening tool 22 position to induce the required peening depth defined by the modeling of the peening process (FIG. 7) and induced by the peening tool 22 to control the load applied by the peening tool 22 to the component 18. Spring 52 exerts a spring force on the second core 32 relative to the first core 30 to control a pressure load exerted by the peening tool 22 and minimize damage to other surfaces of the component 18 and the deformation of the component 18. The controller 11 is also used to control milling operations via other tooling (not shown) in a similar manner.

Spindle 16 is movable along axis X, axis Y, and axis Z, via sliding rails surfaces on the machine (not shown) or other known means. Table 14 moves about axis Y, as shown by arrow A. Platform 12 is movable about axis X, as shown by arrow B. Peening tool 22 is attached to spindle 16 via tool holder 20. The component 18 is disposed on table 14 such that table 14 and platform 12 can move component about axis X and axis Y, as shown by arrows A and B, respectively. Peening tool 22 is movable along axis X, axis Y, and axis Z via spindle 16.

The combined movements of the platform 12, table 14, and spindle 16 define the milling machine 10 as a five axis milling machine 10. Peening tool 22 contacts various surfaces of component 18 using the five axis movement of the platform 12, table 14, and spindle 16.

In one example, platform 12 is also movable along axis X, axis Y, and axis Z. Although a milling machine 10 having five axis movement using platform 12, table 14, and spindle 16 is shown, other configurations and components allowing for five axis movement may be used. However, milling machines 10 capable of movement in a different number of axes may be used depending on complexities of milling machine 10, the complexity of controller 11 and peening tool 22, as well as the components 18 to be peened.

In this example, peening tool 22 is removable from tool holder 20. Tool holder 20 may also be used with cutting tools (not shown), as known, to cut, form, and mill a component 18 being manufactured. In this way, milling of components 18 and peening of components 18 using peening tool 22 can be done on the same milling machine 10 without removal of component 18, or additional machinery or fixtures.

In one example, the component 18 is made of titanium or nickel. However, other materials may be used.

Figure 2:
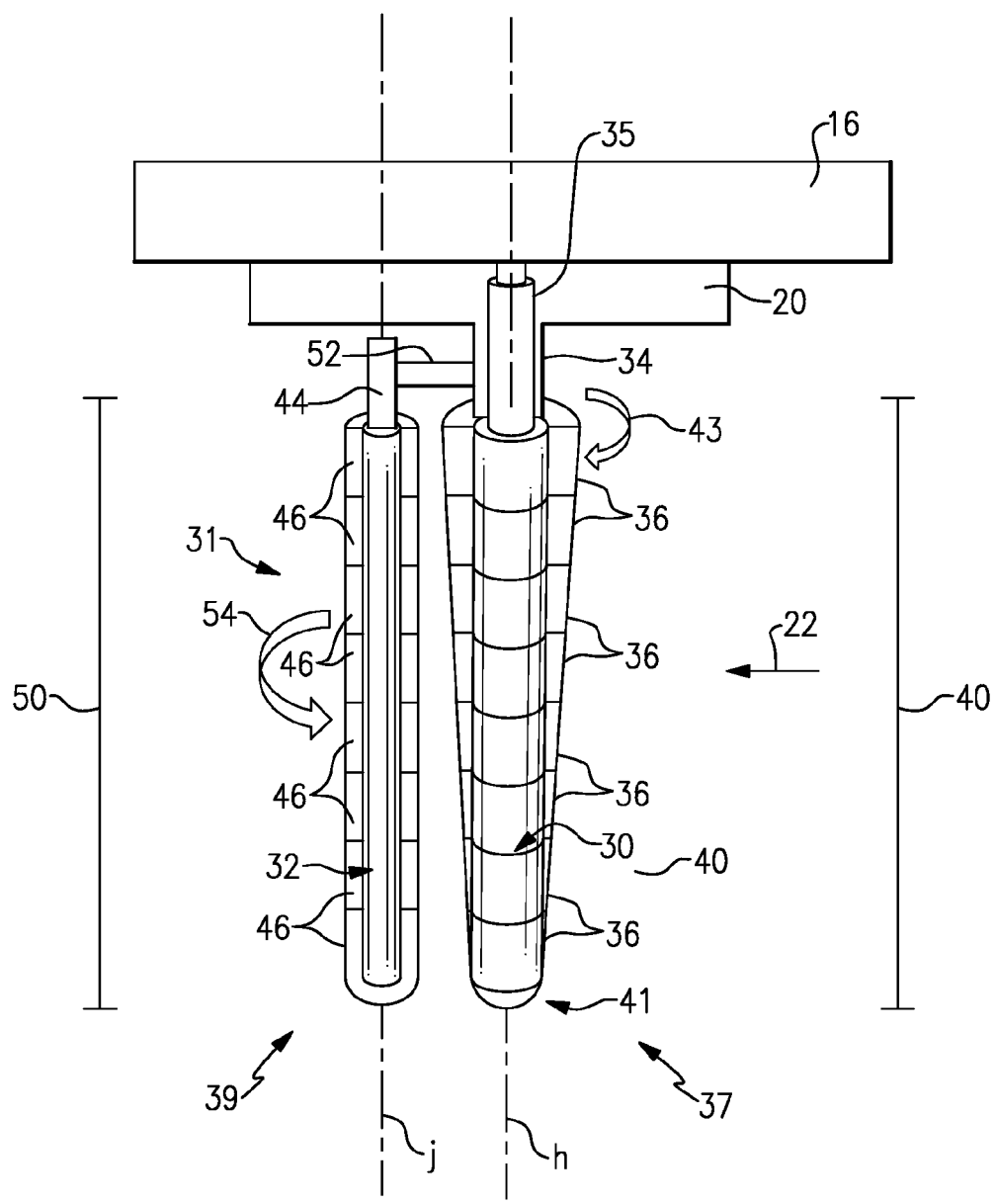
FIG. 2 is a cross-sectional view of an example peening tool.

Referring to FIG. 2, an example peening tool 22 is attached to spindle 16 via holder 20. Peening tool 22 includes a first core 30 defined along axis h and at least one backer 31 including a second core 32 defined along axis j. In this example, first core 30 and second core 32 are generally parallel. However, other arrangements of cores 30, 32 may be used depending on the geometry of the component 18.

The first core 30 is attached via a shaft 34 such that the first core 30 is attached to holder 20. A first roller or a plurality of first rollers 36 is disposed about the first core 30 and along the length of the first core 30, and are powered by a driver 35. For ease of discussion, the first roller or plurality of first rollers 36 are described as the first plurality of rollers 36 hereinafter. A length 40 is defined by the first plurality of rollers 36 arranged to contact the component 18 (FIG. 1). In one example, the length 40 is the entire length of the first core 30. However, other lengths 40 may be used, such that only a portion of the first plurality of rollers 36 is arranged to contact the component 18. In this example, the first plurality of rollers 36 defining length 40 begins at first end 41. However, the length 40 may be any portion of the first plurality of rollers 36. Although length 40 is shown as including a uniform portion of the first plurality of rollers 36, any combination of rollers of the first plurality of rollers 36 may contact component for peening. The first plurality of rollers 36 are able to peen the component 18 by moving along the component 18 and having line contact with a surface of component 18 along length 40.

In this example, the first core 30 is a rotating core 30. The rotation of first core 30 causes rotation of the first plurality of rollers 36 during the peening process. In this example, the first core 30 causes rotation of the first plurality of rollers 36 in a first direction, illustrated by arrow 43. However, first core 30 may rotate in either direction about axis h.

The second core 32 of backer 31 is attached to attachment portion 44. Backer 31 further includes a second roller or plurality of second rollers 46 disposed about second core 32 and along second core 32. For ease of discussion, the second roller or plurality of second rollers 46 are described as a plurality of second rollers 46 hereinafter. The second plurality of rollers 46 is arranged to contact the component 18 (FIG. 1) along a length 50. In this example, length 50 extends the entire length of second core 32. However, length 50 may be any length of the second plurality of rollers 46 to meet the peening requirements of the component 18. In one example, length 50 is equal to or greater than length 40 during peening.

Although the example backer 31 includes a second core 32 and second plurality of rollers 46, it is within the contemplation of this disclosure for backer 31 to be made of different materials such that portions of backer 31 contacting component 18 slide along component 18 while preventing deformation of surface of component 18 not being peened. Backer 31 may be any material which prevents deformation of the surface opposing the surface to be peened.

In this example, second core 32 rotates at a lower speed than the peening tool. As a result, second plurality of rollers 46 rotates about axis j in response to and in a direction opposite the rotation of the first plurality of rollers 36, as shown by arrow 54. However, second plurality of rollers 46 may rotate in either direction.

First core 30 having first plurality of rollers 36 and second core 32 having second plurality of rollers 46 are attached via spring 52. Spring 52 is disposed between attachment portion 44 and shaft 34 such that first plurality of rollers 36 and second plurality of rollers 46 are in register with each other such that the first plurality of rollers 36 and the second plurality of rollers 46 move in unison and the second plurality of rollers 46 is backing the area being peened such that deformation is prevented. Spring 52 provides a force to be applied by first plurality of rollers 36 on a surface of the component 18, as will be described in further detail below.

In this example, the first plurality of rollers 36 form a tapered profile 37 while second plurality of rollers 46 form a cylindrical profile 39. However, the profiles 37, 39 of the first plurality of rollers 36 and second plurality of rollers 46 may be the same or different. The profiles 37, 39 of the first plurality of rollers 36 and second plurality of rollers 46 are determined based on the geometry of the surfaces of the component 18. Several peening tools 22 having different profiles can be used to peen one component 18 on one milling machine 10.

The first plurality of rollers 36 and second plurality of rollers 46 are independently removable from corresponding first core 30 and second core 32, respectively. In this way, the profile 37 of the first plurality of rollers 36 and the profile 39 of the second plurality of rollers 46 may be changed depending on the component 18 to be peened as well as the dimensions of the surface of the component 18 to be peened.

In one example, the first plurality of rollers 36 and second plurality of rollers 46 are made out of at least one of a steel, cemented carbide or ceramic material, and other similar materials, or have a coating thereof. In one example, a lubricant such as oil may be used on the first plurality of rollers 36 and second plurality of rollers 46 to prevent wear on the peening tool 22 due to peening operation.

Figure 4:
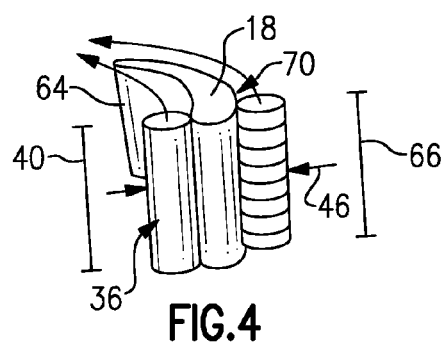
FIG. 4 is a perspective view of the first and second roller of the example peening tool of FIG. 2 and an independent component.

Referring to FIG. 4, with continued reference to FIG. 2, an example portion of an IBR 60 is shown. A plurality of components 18, such as a blade are disposed on disk 62, although it is to be understood that more components 18 may be disposed on disk 62. The peening tool 22 is arranged such that the component 18 is positioned between and in contact with the first plurality of rollers 36 and the second plurality of rollers 46. Spring 52 at least partially causes the first plurality of rollers 36 to apply pressure to a first surface 64 of the component 18. In this example, the length 40 of the first plurality of rollers 36 contacting component 18 is equal to the entire length of first core 30 and the radial length 66 of the component 18. However, the length 40 of the first plurality of rollers 36 contacting the component 18 may encompass a portion less than the radial length 66 of the component 18 as well as a portion less than the entire length of the first core 30.

The second plurality of rollers 46 are disposed on and in contact with opposing surface 70 of the component 18. As the first plurality of rollers 36 peens the component 18 by rolling along the first surface 64, the second plurality of rollers 46 rotate in an opposite direction and move along the corresponding opposite portion of opposing surface 70 in register with the first roller 36 to prevent deformation of opposing surface 70 as the first plurality of rollers 36 peen first surface 64. IBR 60 is situated on table 14 and platform 12. The attachment of the peening tool 22 to holder 20, which is in turn attached to spindle 16 along with the movement of the table 14 and platform 12 (as previously illustrated in FIG. 1) allow the peening tool 22 to reach all surfaces of the component 18 despite the limited space available between the plurality of components 18 on the IBR 60. In this example, the peening tool 22 allows for peening of a component 18 of an IBR 60 without individual removal of the component 18 from the disk 62 of the IBR 60 despite the limited space between components 18.

As the first plurality of rollers 36 and second plurality of rollers 46 contact and move along opposing surfaces 64, 70 of the component 18, the pressure applied by first plurality of rollers 36 is uniformly distributed along the length 40 of the first plurality of rollers 36 contacting the component 18.

Figure 3:
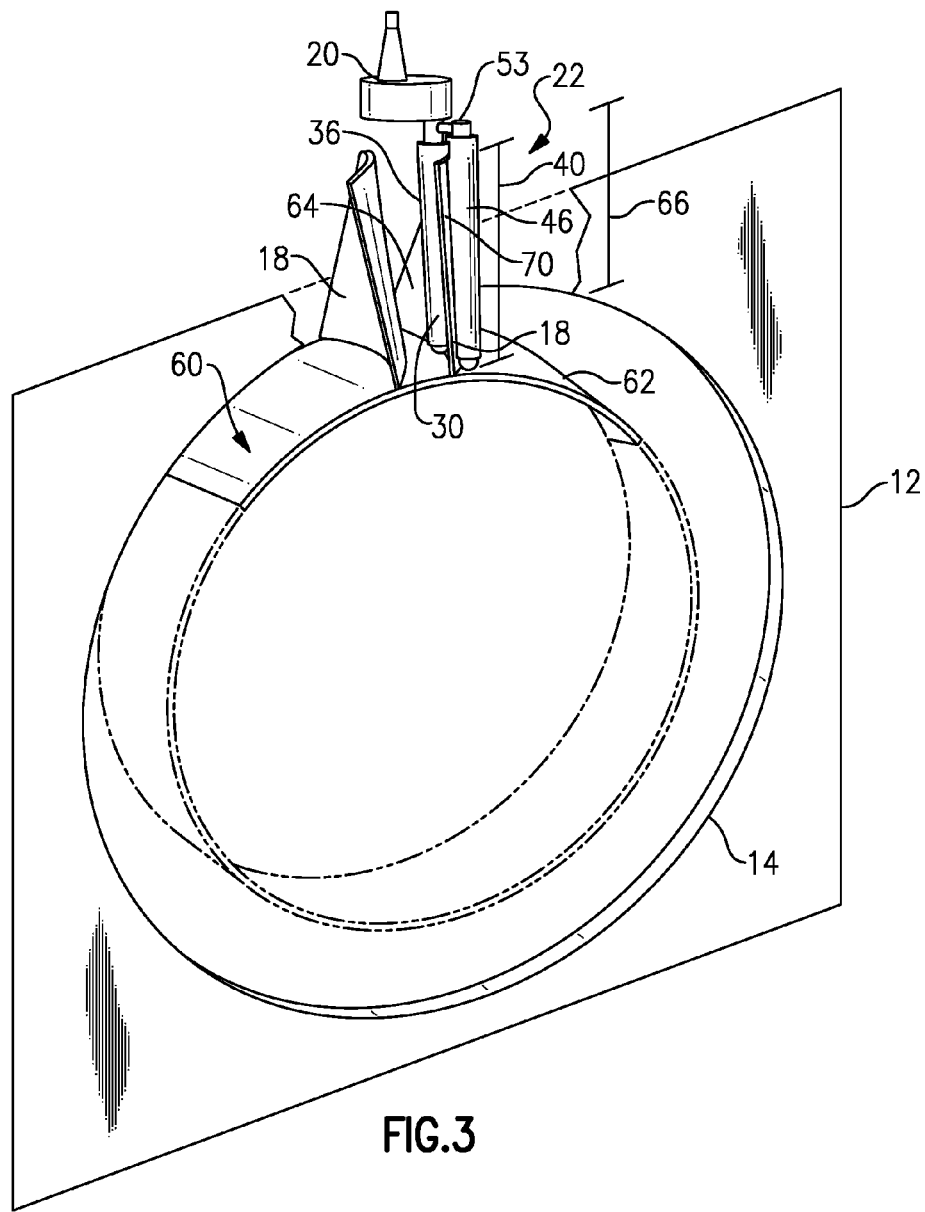
FIG. 3 is a perspective view of the example peening tool of FIG. 2 and an IBR on portions of the example milling machine of FIG. 1.

Referring to FIG. 4, with continued reference to FIG. 3, another example component 18 is shown. In this example, the component 18 is separated from other turbomachinery and individually peened. In this example, the length 40 of the first plurality of rollers 36 contacting component 18 contacts the entire radial length 66 of the component 18. In this example, length 40 also defines the second plurality of rollers 46 contacting opposing surface 70. As shown by arrows, the first plurality of rollers 36 and second plurality of rollers 46 move in register to peen the first surface 64 of component while preventing deformation of opposing surface 70. First plurality of rollers 36 and second plurality of rollers 46 of other lengths are contemplated herein such that length 40 only includes a portion of radial length 66 of the component 18.

Referring to FIGS. 5A-5F, with continued reference to FIG. 3, a plurality of different profiles 136 of a plurality of rollers 138 is shown. Each of the plurality of rollers 138 form a profile 136. The plurality of rollers 138 are arranged to form the different geometrical configurations of the various profiles 136. The plurality of rollers 138 is disposed about and along a core 130. The various profiles 136 of the plurality of rollers 138 are used to allow for configuration of the plurality of rollers 136 for use on the peening tool 22 (FIGS. 2-5) to follow and peen surface of the component 18 having different dimensions (not shown). The plurality of rollers 138, forming different profiles 136, may be used as the first plurality of rollers 36, around and about first core 30, or as the second plurality of rollers 46 around and about second core 32 of peening tool 22, as shown in FIGS. 2-5. Although example profiles 136 of a plurality of rollers 138 are shown, other profiles 136 are within the contemplation of this disclosure.

Referring to FIG. 5A, the plurality of rollers 138 has a generally tapered profile 136, tapering from flat end 132 on an attachment side 140 to flat end 134 on a non-attachment side 140.

Referring to FIG. 5B, the plurality of rollers has a generally conical profile 136 having flat end 132 on an attachment side 140 and rounded end 134 on a non-attachment side 142.

Referring to FIG. 5C, the plurality of rollers has a combination profile 136 that is a generally ellipsoidal profile on a non-attachment side 142 and is a generally tapered neck profile on attachment side 140.

Referring to FIG. 5D, the plurality of rollers 138 has a generally tapered profile 136 that tapers from rounded end 134 on a non-attachment side 142 to flat end 132 on an attachment side 140.

Referring to FIG. 5E, the plurality of rollers 138 has a combination profile 136 that is a generally cylindrical profile 146 on the attachment side 140 and a generally spherical profile 148 on a non-attachment side 142.

Referring to FIG. 5F, the plurality of rollers 138 has an adaptable profile 136 which corresponds to a surface to be peened.

Referring to FIGS. 5A-5F, the attachment side 140 corresponds to a side which will be attached to spindle 16 (FIGS. 2-4) whereas the non-attachment side 142 corresponds to the end opposite the attachment side 140. However, any profiles 136 may be mirrored such that they begin on either the attachment side 140 or the non-attachment side 142.

Figure 6A:
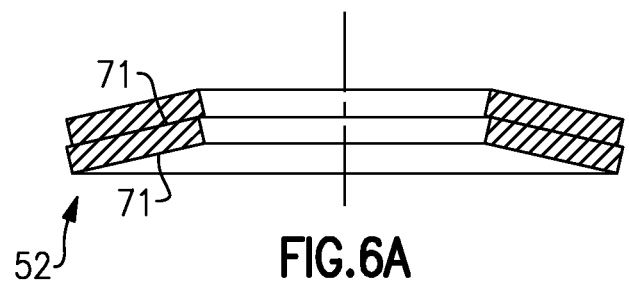
FIG. 6a is a perspective view of an example spring of the example peening tool of FIG. 2.
Figure 6B:
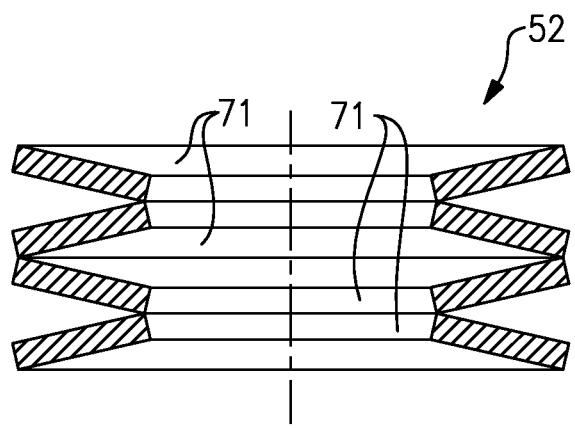
FIG. 6b is a perspective view of another example spring of the example peening tool of FIG. 2.

Referring to FIGS. 6a and 6b, with continued reference to FIGS. 2-4, an example spring 52 is shown. In this example, the spring 52 is a plurality of Bellville spring washers 71. However, other types of springs 52 may be used.

As shown in FIG. 6a, the spring 52 may be arranged by stacking spring washers 71 in parallel, which effectuates an increase in load. As shown in FIG. 6b, the spring components 70 may be stacked in series, which effectuates an increase in deflection. It is within contemplation of this disclosure to use either the arrangements of FIG. 6a or 6b or a combination of parallel and series stacking, as shown in both FIG. 6a and FIG. 6b. The spring 52 exerts a spring force on the first core 30 and the second core 32 to control the pressure load exerted by the peening tool 22. In this way, the force exerted by first plurality of rollers 36 is determined by the spring 52 based on a pre-determined arrangement of spring washers 71 forming the spring 52. However, it is within the contemplation of the disclosure to use other springs 52 and arrangements of spring washers 71 for application of various forces by the first plurality of rollers 36, as needed during peening.

Figure 7:
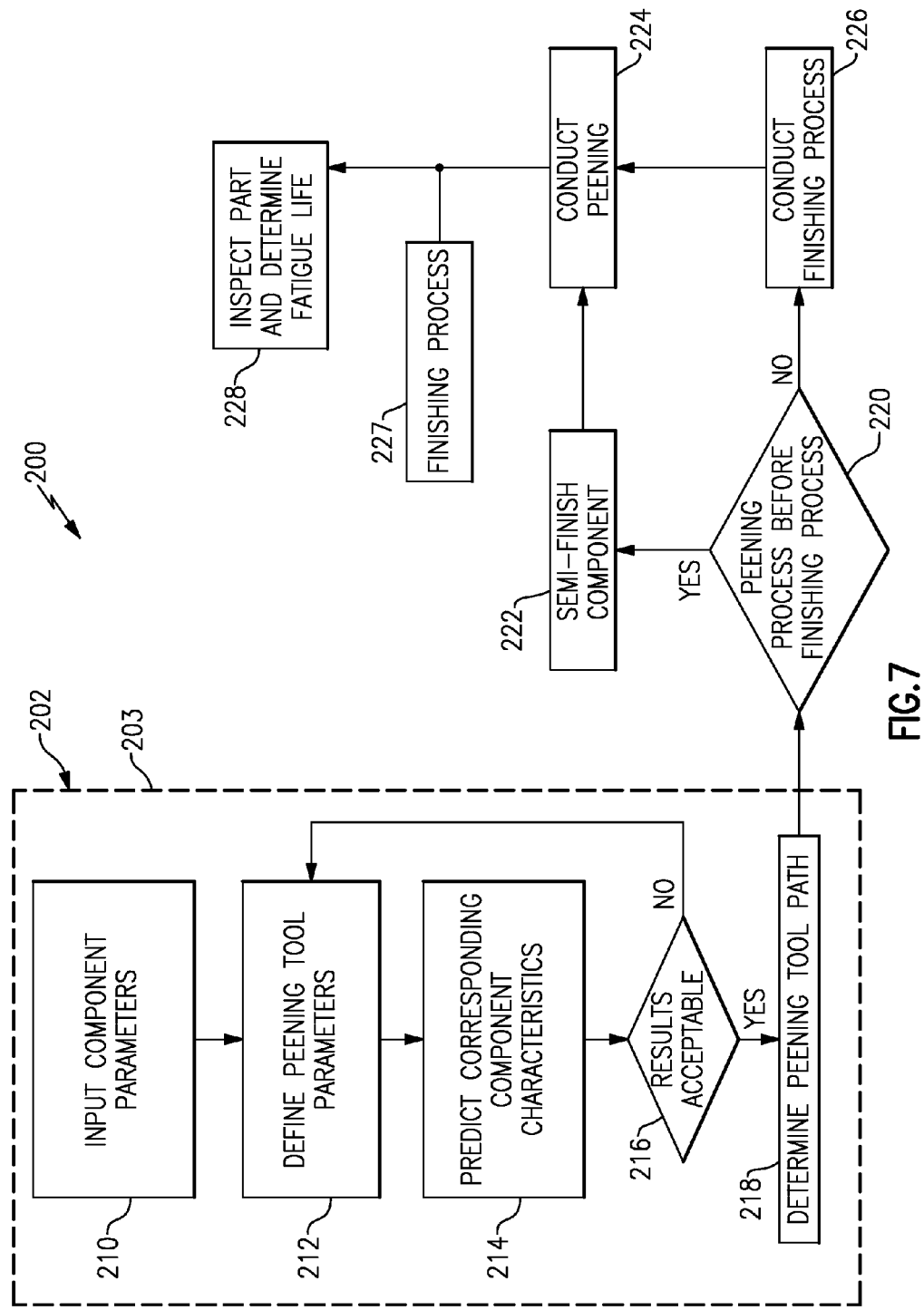
FIG. 7 is a perspective view of an example flow chart of the peening process.

Referring to FIG. 7, with continued reference to FIGS. 1-6, a flow chart 200 of example steps of the peening process is shown. Peening parameters may be defined by using both finite element, stochastic and mechanistic modeling 202. Modeling 202 allows determination of parameters controlling the interaction between peening tool 22 and component 18 to provide peening of the component 18. A residual stress profile, subsurface conditions, surface load, and spring load and other relevant component 18 parameters may be input 210. The surface load may be determined to produce the residual stress profile. The spring load may be defined between peening tool 22 and backer 31.

In one example, modeling 202 is processed via the controller 11. In another example, modeling 202 is processed via a computer 203, or other external device and input via the controller 11. However, other systems allowing modeling 202 may be used.

The peening tool 22 parameters are defined based on the component inputs at step 212. Peening tool 22 parameters may include, but are not limited to, dimensions, peening depth, and rotation speed of the first core 30. In one example, the predicted surface and spring loads are used to define the required peening depth. In another example, a desired temperature at the interface between the peening tool 22 and the component 18 may be predicted to define the peening tool 22 rotation speed (spindle 16 RPM).

The corresponding component 18 characteristics are predicted, based on the input parameters and the peening tool 22 parameters, at step 214. These characteristics may include, but are not limited to, pressure, surface residual stress, cold work depth, and residual stress depth resulting from the inputs and peening tool 22.

The theoretical results are reviewed at step 216. If the results are not acceptable, the peening tool 22 parameters are re-defined 212. If the results are acceptable, a path for the peening tool 22 on component 18 is determined at step 218. The outputs of the example modeling 202 are the peening tool 22 depth of penetration, the number of peened paths, the peening tool 22 rotational speed, and peening length. However, other outputs may be used.

In one example, the spindle 16 speed used with peening tool 22 can be in the range of 500 to 5000 RPM based on the material of component 18 and peening load. The depth of peening on component 18 can be in the range of 0.001-0.003 inches (0.00254-0.00762 cm), and the feed per rotation, or step over, can be in the range of 0.0005 to 0.002 inches (0.00127-0.00508 cm). The load applied by peening tool 22 can be in the range of 200-1000 lbs. (90.72-453.59 kg).

After modeling 202 provides necessary outputs for the peening tool 22 and milling machine 10, peening occurs either before a finishing process or after a finishing process 220. When peening occurs before the finishing process, the component is semi-finished 222 such that the surfaces of the component 18 are partially roughed to remove large variations on the surface. Peening is then conducted 224, as described above in this disclosure.

If peening occurs after the finishing process, a finishing process is conducted 226, followed by conducting peening 224. Finishing process 226 may include completely roughing the surfaces of component 18, and otherwise creating component 18 with generally smooth surfaces.

After peening occurs at step 224, a second finishing process 227 may optionally be undertaken 228. The component 18 is then inspected and the component 18 fatigue life is predicted at step 228.

Although the example modeling 202 and peening process 200 is shown, it is within the contemplation of this disclosure to include additional steps, or different arrangement or combination of steps to model and peen a component 18.

In operation, a component 18 is disposed on table 14 of the milling machine 10. In this example, the profile 37 of the first plurality of rollers 36 and the profile 39 of the second plurality of rollers 46 are determined based on the component 18 geometry and profile. The target residual stress of the component 18, the depth of the peening, and the magnitude of the peening are also considered determining the profiles 37, 39 of the first plurality of rollers 36 and second plurality of rollers 46, respectively. A determination of the load to be applied by the peening tool 22 is made. As a result, a rotation speed of first core 30 is determined, and results in a rotation speed of the first plurality of rollers 36 and second plurality of rollers 46. In one example, the load force that the peening tool 22 applies to the component 18 is dependent on the material of the component 18. The controller 11 controls how much load force the peening tool 22 applies at any given time, as well as the rotation speed of the first core 30. The load pressure to be applied by the peening tool 22 is adjustable depending on the portion of the component 18 to be peened. The first plurality of rollers 36 and the second plurality of rollers 46 move in response to the summed speed of the platform 12, table 14, and spindle 16, while rotating based on the rotation speed of the first core 30.

Once the profiles 37, 39 of the first plurality of rollers 36 and the second plurality of rollers 46 are determined, the path of the peening tool 22 while contacting the component 18 is mapped. In one example, the path will encompass the entire surface of the component 18 to be peened. In another example, multiple paths may be determined to reach different areas of the surface of the component 18 to be peened.

After the peening tool 22 is attached to the spindle 16 via tool holder 20, the peening process begins as the spindle 16 moves the peening tool 22, in conjunction with the platform 12 and table 14 moving component 18, to provide 5-axis, or any multiple axis movement, such that the peening tool 22 can reach all surfaces of the component 18 to be peened. As a result of the use of peening tool 22, a peened surface of the component 18 is created having minimal surface roughness.

The peening tool 22 is also configured to prevent deformation of surfaces which are not being peened via backer 31. The backer 31 provides a backing force driven by the strength of spring 52. The line contact of the first plurality of rollers 36 is in register with line contact of the backer 31.

In one example, the use of the peening tool 22 negates the need for a finishing step, which may include removing a thin layer of the remaining component 18 surface to meet necessary component 18 specifications. Peening using the peening tool 22 results in a surface smooth enough to meet necessary technical specification of the component 18.

Although a preferred embodiment has been disclosed, a worker of ordinary skill in this art would recognize that certain modifications would come within the scope of this disclosure. For that reason, the following claims should be studied to determine the true scope and content of this disclosure.

What is claimed is:

1. A peening tool comprising:
   at least one first roller having a peening surface disposed about and along a first core, wherein at least a portion of the at least one first roller is configured to contact a component to be peened along a length, said length extending along at least a portion of the first core, the at least one first roller configured to provide line contact on the component along the length, wherein a profile of the at least one first roller is determined based on a profile of the component; and a backer disposed in register with the at least one first roller such that the at least one first roller moves with the backer during peening, wherein the at least one first roller and the backer are configured to be arranged on opposing surfaces of the component;

wherein the backer is at least one second roller disposed about and along a second core, the at least one second roller in register with the at least one first roller such that the at least one first roller moves with the at least one second roller during peening, wherein the at least one first roller and the at least one second roller are configured to be arranged on opposing surfaces of the component;

wherein the at least one first roller and the at least one second roller are independently removable from the first core and second core, respectively.

2. A peening tool comprising:

at least one first roller having a peening surface disposed about and along a first core, wherein at least a portion of the at least one first roller is configured to contact a component to be peened along a length, said length extending along at least a portion of the first core, the at least one first roller configured to provide line contact on the component along the length, wherein a profile of the at least one first roller is determined based on a profile of the component; and a backer disposed in register with the at least one first roller such that the at least one first roller moves with the backer during peening, wherein the at least one first roller and the backer are configured to be arranged on opposing surfaces of the component;

wherein the backer is at least one second roller disposed about and along a second core, the at least one second roller in register with the at least one first roller such that the at least one first roller moves with the at least one second roller during peening, wherein the at least one first roller and the at least one second roller are configured to be arranged on opposing surfaces of the component;

wherein the profile of the at least one first roller and a profile of the at least one second roller are non-uniform;

wherein:

the at least one first roller includes a plurality of first rollers;

the at least one second roller includes a plurality of second rollers; and the at least one first rollers have a first end, a second end, and a profile between the first and second ends, the profile being one of (1) generally tapered, (2) generally conical, (3) generally ellipsoidal, (4) and generally spherical along a first portion of the profile and generally cylindrical along a second portion of the profile.

3. The peening tool of claim 2, wherein the profile of the at least one first roller is tapered.

4. The peening tool of claim 2, wherein the first core is a rotating core.

5. The peening tool of claim 2, wherein the at least one first roller and the backer are attached by a spring.

6. The peening tool of claim 5, wherein the spring includes a plurality of stacked Bellville spring washers.

7. A tooling system for peening comprising:

a milling machine having a spindle moveable along three (3) axes and a base moveable about two rotatable (2) axes, said base configured to hold at least one component; and a peening tool attached to the spindle, the peening tool including at least one first roller having a peening surface disposed about and along a first core, wherein at least a portion of the at least one first roller is configured to contact a component to be peened along a length, said length extending along at least a portion of the first core, the at least one first roller configured to provide line contact on the component along the length, wherein a profile of the at least one first roller is determined based on a profile of the component, wherein at least one second roller is disposed about and along a second core, the at least one second roller in register with the at least one first roller such that the at least one first roller moves with the at least one second roller during peening, wherein the at least one first roller and the at least one second roller are configured to be arranged on opposing surfaces of the component; and wherein:

the at least one first roller includes a plurality of first rollers;

the at least one second roller includes a plurality of second rollers; and the at least one first rollers have a first end, a second end, and a profile between the first and second ends, the profile being one of (1) generally tapered, (2) generally conical, (3) generally ellipsoidal, (4) and generally spherical along a first portion of the profile and generally cylindrical along a second portion of the profile.

8. The tooling system of claim 7, wherein the base includes a platform moveable about a first of the two axes and a table moveable about a second of the two axes, said base further moveable along any linear axes.

9. The tooling system of claim 8, wherein the spindle is adapted to be used with a milling tool.

10. The tooling system of claim 8, further including a controller in communication with the milling machine, wherein the controller controls at least one of a position, rotating speed and feed of the at least one first roller, and a path of the at least one first roller and the at least one second roller.

11. The tooling system of claim 7, wherein the at least one first roller and the at least one second roller are attached by a spring.

12. The tooling system of claim 11, wherein the spring includes a plurality of stacked Bellville spring washers.

13. The tooling system of claim 7, wherein the profile of the at least one first roller and a profile of the at least one second roller are non-uniform.

* * * * *